United States Patent
Hansen

(10) Patent No.: US 8,233,565 B2
(45) Date of Patent: Jul. 31, 2012

(54) METHOD AND SYSTEM FOR HIGH SPEED WIRELESS DATA TRANSMISSION BETWEEN COMMUNICATION DEVICES

(75) Inventor: Christopher James Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1160 days.

(21) Appl. No.: 11/584,213

(22) Filed: Oct. 20, 2006

(65) Prior Publication Data

US 2008/0095104 A1  Apr. 24, 2008

(51) Int. Cl.
*H04L 27/04* (2006.01)

(52) U.S. Cl. ........ 375/310; 375/312; 375/315; 375/220; 375/141

(58) Field of Classification Search .................. 375/310, 375/304, 150, 148; 370/329, 437, 278
See application file for complete search history.

(56) References Cited

U.S. PATENT DOCUMENTS

| | | | | |
|---|---|---|---|---|
| 5,335,325 | A * | 8/1994 | Frank et al. | 711/163 |
| 6,512,751 | B1 * | 1/2003 | Struhsaker et al. | 370/329 |
| 7,409,450 | B2 * | 8/2008 | Jorgensen | 709/226 |
| 2002/0024937 | A1 * | 2/2002 | Barnard et al. | 370/278 |
| 2003/0211855 | A1 * | 11/2003 | Sarkkinen et al. | 455/466 |
| 2004/0213180 | A1 * | 10/2004 | Cho et al. | 370/329 |
| 2004/0217948 | A1 | 11/2004 | Kawasaki et al. | |
| 2005/0046616 | A1 | 3/2005 | Sai et al. | |
| 2006/0294550 | A1 * | 12/2006 | Matsuo | 725/68 |
| 2010/0135238 | A1 * | 6/2010 | Sadri et al. | 370/329 |

FOREIGN PATENT DOCUMENTS

| | | |
|---|---|---|
| EP | 0 784 387 | 7/1997 |
| WO | WO 2004/114458 | 12/2004 |
| WO | WO 2007/078162 | 7/2007 |

OTHER PUBLICATIONS

European Search Report corresponding to European Patent Application Serial No. 07010835.2-2412, mailed Nov. 11, 2008, 3 pages.

* cited by examiner

*Primary Examiner* — Kenneth Lam
*Assistant Examiner* — Qutbuddin Ghulamali
(74) *Attorney, Agent, or Firm* — Garlick & Markison

(57) ABSTRACT

Herein described are at least a method and a system for transmitting high speed wireless data from a first communication device to a second communication device. The method comprises using a first physical layer for transmitting management data or control signals between the first and second devices. In one embodiment, the management data may be used to authenticate and assign an appropriate wireless communication channel between the first and second device. The wireless communication channel is established by implementing a second physical layer in each of the first and second devices. The wireless communication channel may be used to transmit the high speed wireless data. The system comprises a first communication device and a second communication device wherein each of the first communication device and the second communication device utilizes a first physical layer and a second physical layer.

23 Claims, 3 Drawing Sheets

METHOD AND SYSTEM FOR HIGH SPEED WIRELESS DATA TRANSMISSION BETWEEN COMMUNICATION DEVICES

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Existing wireless networking standards, such as 802.11, 802.15, and Wimedia utilize CSMA (carrier sense multiple access) protocols to transmit data using omni-directional antennas. However, when data rates increase, the use of such standards becomes impractical. For example, the use of the CSMA protocol is inefficient, since each data packet header comprises a higher percentage of overhead compared to the transmitted data, as the data rate increases. Furthermore, the required transmit power using an omni-directional antenna is not practical when the data is transmitted at higher rates. In addition, introduction of faster versions of these wireless networking standards require that their corresponding protocol be backward compatible to each of the previously existing versions. As a consequence, a new version of such a wireless networking standard may be burdened with additional software constraints and/or requirements.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and system for transmitting high speed wireless data from a first device to a second device, as substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention can be found in a method and a system for wirelessly transmitting high speed data between two devices. Each of the two devices may comprise any type of wireless communication device. For example, the wireless communication device may comprise a computer, multimedia or video player, or a high definition (HD) digital camera. Various aspects of the invention utilize a first physical layer (i.e., physical connection or PHY) to bidirectionally transmit one or more control signals that manage the transmission of the high speed data between a first device and a second device. The various aspects of the invention may utilize a second physical layer to transmit high speed wireless data between the first device and the second device. In a representative embodiment, the high speed data is transmitted unidirectionally from one device to another device. Furthermore, the various aspects of the invention utilize a first bandwidth to bidirectionally transmit one or more control signals that manage the transmission of the high speed wireless data. In a representative embodiment, the first physical layer may operate in burst mode while the second physical layer may operate in non-burst mode.

A first bandwidth may be used in association with the first physical layer while a second bandwidth may be used in association with the second physical layer. For example, two devices that communicate using the IEEE 802.11 standard may adapt the various aspects of the invention. The computing devices may utilize IEEE 802.11, for example, for transmitting the one or more control signals over the first bandwidth through each device's first physical layer. Further, these two devices may be adapted to utilize the second bandwidth for transmitting the high speed wireless data through each device's second physical layer. In a representative embodiment, the high speed data may be transmitted or received in a particular direction by way of using a directional antenna on a transmitting or receiving device. For example, the direction of an antenna's beam may be determined by way of using the one or more control signals to manage the rotation or movement of the directional antenna. The one or more control signals may be used to obtain and communicate various handshaking and/or device management data between the first and second devices. The rotation or movement of the directional antenna of the first device or the second device may be based on the position or location of the first device relative to the second device, for example.

Figure 1A:
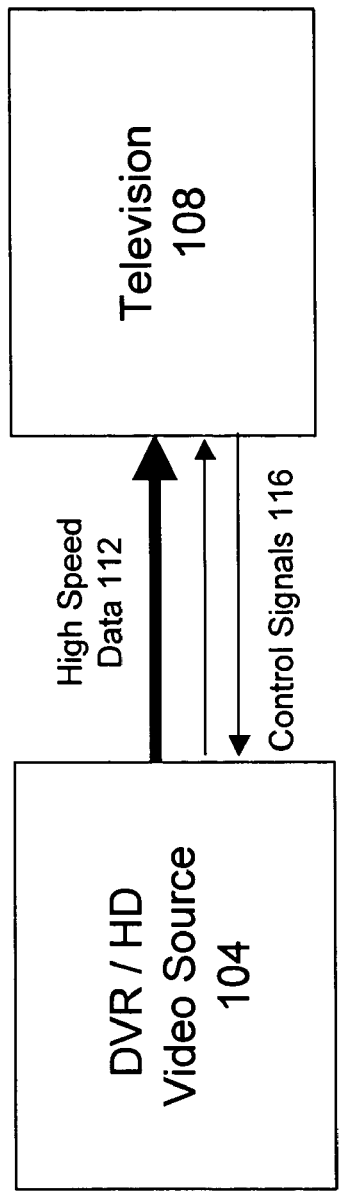
FIG. 1A is a block diagram illustrating two exemplary devices that transmit control signals over a first physical connection and a high speed data signal over a second physical connection, in accordance with an embodiment of the invention.

FIG. 1A is a block diagram illustrating two exemplary devices that transmit control signals 116 over a first physical connection (i.e., PHY or physical layer) and high speed data 112 over a second physical connection (i.e., PHY or physical layer), in accordance with an embodiment of the invention. As shown, bidirectional control signals 116 are transmitted between a digital video recorder (DVR)/high definition (HD) video source 104 and a television 108 while high speed data 112 is transmitted unidirectionally from the DVR/HD video source 104 to the television 108. The control signals 116 may be used for setup, initialization, and configuration management of the DVR/HD video source 104 and the television 108 such that the high speed data 112 is properly transmitted and received between the video source 104 and the television 108.

The control signals 116 may be used to perform "handshaking" between two devices, prior to the transmission of high speed data. Additionally, the control signals 116 may perform "traffic management" of the high speed data 112 that is transmitted from the DVR/HD video source 104 and the television 108. The DVR/HD video source 104 may be used to transmit a movie to the television 108, for example. In a representative embodiment, the control signals 116 may be transmitted over a low bandwidth connection while the high speed data 112 may be transmitted over a high bandwidth connection. In a representative embodiment, the low bandwidth connection may conform to IEEE 802.11, IEEE 802.15, or ECMA-368/369 (Wimedia UWB) communication standards. Details of the IEEE 802.11 and IEEE 802.15 standards may be readily obtained from the Institute of Electrical and Electronics Engineers while the details of the ECMA-368/369 standards may be obtained from ECMA International (an industry standards organization). The high bandwidth connection may be associated with a point to point wireless communication channel for transmitting the high speed data 112. The high speed data transmission may utilize any available spectrum. In a representative embodiment, the high speed data 112 is transmitted over an available spectrum between 59-66 Ghz. The high speed data may be transmitted at a speed up to approximately 10 Gbps, for example.

Figure 1B:
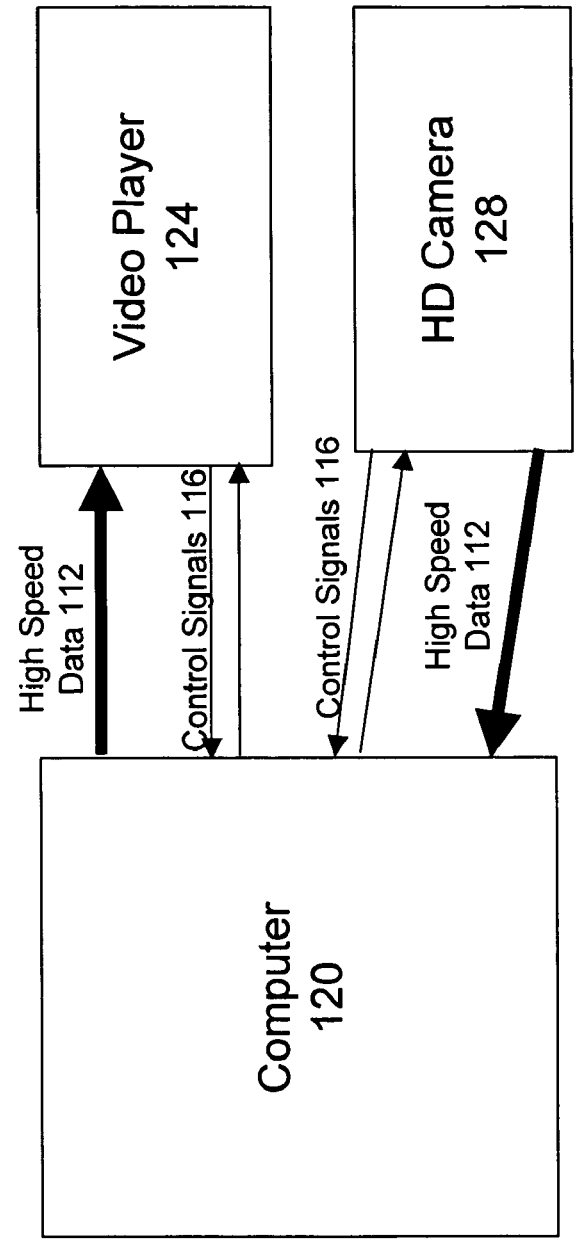
FIG. 1B is a block diagram illustrating exemplary devices that transmit control signals over a first physical connection and a high speed data over a second physical connection, in accordance with an embodiment of the invention.

FIG. 1B is a block diagram illustrating exemplary devices that transmit control signals 116 over a first physical connection (i.e., PHY or physical layer) and a high speed data 112 over a second physical connection, in accordance with an embodiment of the invention. Bidirectional control signals 116 may be transmitted between a computer 120 and a video player 124 and between the computer 120 and a high definition (HD) camera 128, for example. The bidirectional control signals 116 may be transmitted using a low bandwidth connection while the high speed data 112 may be transmitted over a high bandwidth connection. The video player 124 may comprise a video IPOD, for example. The computer 120 may be used to stream the high speed data 112, such as a high definition (HD) video, to the video player 124, for example. In this fashion, a viewer may conveniently watch a HD movie using his video IPOD, for example. In the representative embodiment of FIG. 1B, the HD camera 128 may be used to stream a high definition (HD) video or photograph to the computer 120. When using either the video player 124 or the HD camera 128 with the computer 120, bidirectional control signals 116 may be used to configure, initiate, setup, and tear-down any high speed data 112 that is transmitted. In a representative embodiment, an antenna positioned within each device (i.e., computer 120, video player 124, or HD camera 128) may be controlled by way of the control signals 116. The antenna may be used for receiving and/or transmitting the high speed data 112. For example, an antenna may position its beam in a particular direction by way of using these control signals 116. The antenna may be positioned to maximize transmission gain in a particular direction, such that a high speed data transmission may be efficiently received, for example. In a representative embodiment, the directional antenna operates by using a beamwidth of approximately 6.4 to 64 degrees.

Figure 2:
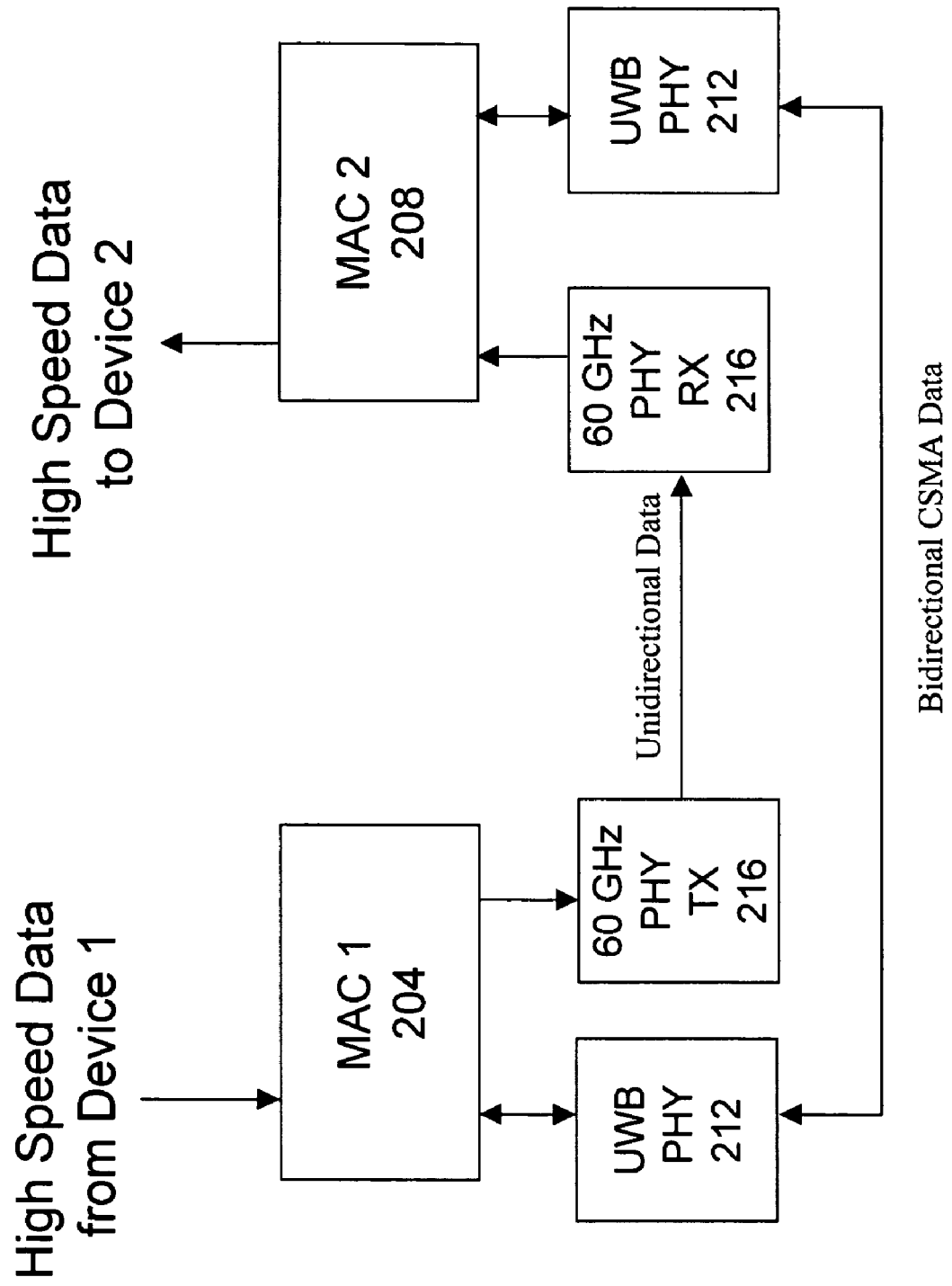
FIG. 2 is a block diagram illustrating a single media access control address and two physical layers, used by each of two devices, in accordance with an embodiment of the invention.

FIG. 2 is a block diagram illustrating a single media access control (MAC) address and two physical layers, used by each of two devices, in accordance with an embodiment of the invention. The first of the two devices utilizes a first MAC address 204 and two physical layers 212, 216 (i.e., two physical connections or "PHYs"). The first physical layer 212 may comprise a physical layer that supports Ultrawideband (UWB) Wimedia transmission while the second physical layer 216 may support high speed transmission at a bandwidth centered at approximately 60 Ghz. Likewise, the second of the two devices utilizes a second MAC address 208 and the two physical layers 212, 216. For example, the first physical layer 212 may conform to the Ultrawideband (UWB) Wimedia physical layer (as specified in the ECMA-368/369 standard) while the second physical layer 216 may comprise any physical layer that supports a high speed unidirectional data transmission over a bandwidth centered at approximately 60 Ghz. The first physical layer 212 may conform to any wireless standard that utilizes a CSMA protocol in its physical layer. The first physical layer 212 may conform to IEEE 802.11 or IEEE 802.15, or ECMA-368/369, for example. As shown in FIG. 2, the second physical layer 216 may be configured for transmission in only one direction as a means for providing uninterrupted unidirectional data transmission from one device to the other. However, the first physical layer 212 may be used for providing one or more bidirectional control signals between the two devices. The bidirectional control signals may carry device management data such as configuration, timing, and/or control data. The one or more control signals may facilitate authentication and association of devices, assignment of a communication channel for transmitting high speed data between the two devices, and may also facilitate antenna training and setup for the two devices. The communication channel is implemented using the second physical layer 216 provided in the two devices. The second physical layer 216 may be used to carry the high speed data that is transmitted unidirectionally from the first device to the second device. The second physical layer 216 may transmit the high speed data using a frequency division multiple access (FDMA) or a time division multiple access (TDMA) protocol. In a representative embodiment, the high speed data may be transmitted at rates of up to approximately 10 Gbps.

Figure 3:
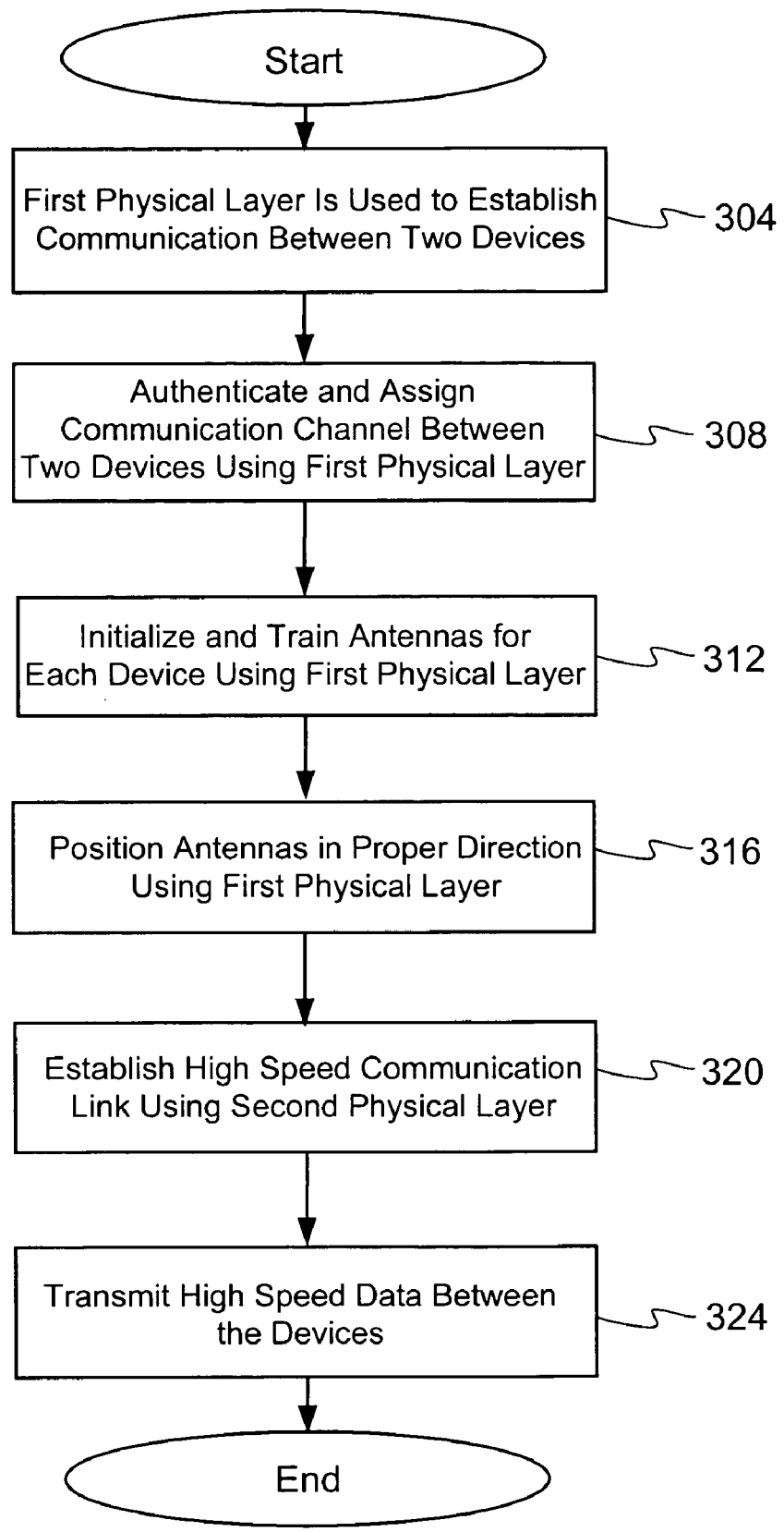
FIG. 3 is an operational flow diagram illustrating a method by which high speed wireless data is transmitted between two devices, in accordance with an embodiment of the invention.

FIG. 3 is an operational flow diagram illustrating a method by which high speed wireless data is transmitted between two devices, in accordance with an embodiment of the invention. At step 304, a first physical layer is used to establish communication between a first device and a second device. The first physical layer may conform to a CSMA protocol. For example, the first physical layer may conform to IEEE 802.11, 802.15, or ECMA-368/369. In a representative embodiment, the first or second device may transmit a beacon for communicating its presence and availability by using the CSMA protocol. The first or second device may transmit one or more control signals for managing the transmission of the high speed wireless data. The beacon and/or one or more control signals may be transmitted over a first bandwidth. The first or second device may transmit the beacon omni-directionally. Next, at step 308, the first physical layer may be used for authenticating and assigning a communication channel between the first and second devices, for example. The communication channel may be used by a second physical layer to transmit the high speed wireless data. Thereafter, at step 312, each of the directional antennas associated with the first and second devices is initialized and trained, in preparation for positioning each directional antenna for optimal transmission and reception of the high speed wireless data. At step 316, the directional antennas are optimally positioned to provide effective transmission of the high speed wireless data between the first device and the second device. Next, at step 320, a high speed communication channel is properly established using a second physical layer in the first and second devices. The second physical layer may transmit the high speed wireless data over a second bandwidth (that is distinct from the first bandwidth). Finally, at step 324, the high speed wireless data is transmitted between the first and the second devices. The high speed wireless data may comprise any type of data and may comprise multimedia, video, audio, and/or voice data. In a representative embodiment, the high speed wireless data is transmitted unidirectionally, for example, from the first device to the second device. In a representative embodiment, the transmitted power may range from +5 to +10 dBM, the transmitter and/or receiver gain may range from +10 to +30 dB, the RF bandwidth may be approximately 2 Ghz, while the system noise figure may range from 8 to 20 dB.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of transmitting high speed wireless data between wireless devices comprising:
    using a first physical layer of a first wireless device to transfer bidirectionally control signals wirelessly between the first wireless device and a second wireless device over a first bandwidth, wherein the control signals include an antenna training signal to directionally position an antenna of the first wireless device and an antenna of the second wireless device to directionally communicate with each other, and wherein the first physical layer is coupled to a media access control (MAC) layer; and
    using a second physical layer of the first wireless device to transmit the high speed wireless data between the first wireless device and the second wireless device using the directionally positioned antenna over a second bandwidth, which is of a different bandwidth than the first bandwidth, to transmit the high speed wireless data, after completion of antenna training using the first physical layer, wherein the second physical layer is also coupled to the MAC layer.

2. The method of claim 1 wherein the control signals provide setup, initialization, and management of the high speed wireless data transmission from the first wireless device to the second wireless device.

3. The method of claim 1 wherein the first physical layer utilizes a carrier sense multiple access (CSMA) protocol.

4. The method of claim 3 wherein the CSMA protocol conforms with Ultrawideband Wimedia or an ECMA-368/369 standard.

5. The method of claim 3 wherein the CSMA protocol conforms with IEEE 802.11.

6. The method of claim 3 wherein the CSMA protocol conforms with IEEE 802.15.

7. The method of claim 1 wherein the second bandwidth is higher than the first bandwidth.

8. The method of claim 1 wherein the high speed wireless data is transmitted unidirectionally.

9. The method of claim 1 wherein the MAC layer uses a same MAC address with both the first and second physical layers.

10. The method of claim 1 wherein the first physical layer operates in burst mode and the second physical layer operates in non-burst mode.

11. The method of claim 1 wherein the high speed wireless data comprises high definition (HD) video data.

12. The method of claim 1 wherein the second bandwidth is approximately at 60 GHz.

13. An apparatus to transmit high speed wireless data comprising:
    a media access control (MAC) layer;
    a first physical layer, coupled to the MAC layer, to transfer bidirectionally control signals wirelessly with a wireless device over a first bandwidth, wherein the control signals include an antenna training signal to directionally position an antenna of the apparatus and an antenna of the wireless device to directionally communicate with each other; and
    a second physical layer, also coupled to the MAC layer, to transmit high speed wireless data to the wireless device, and the apparatus and the wireless device to use directional antennas over a second bandwidth, which is of a different bandwidth than the first bandwidth, to transmit the high speed wireless data, after completion of antenna training using the first physical layer.

14. The apparatus of claim 13, wherein the first physical layer utilizes a carrier sense multiple access (CSMA) protocol.

15. The apparatus of claim 14, wherein the first physical layer conforms to an ECMA-368/369 standard.

16. The apparatus of claim 14, wherein the first physical layer conforms to IEEE 802.11.

17. The apparatus of claim 14, wherein the first physical layer conforms to IEEE 802.15.

18. The apparatus of claim 13, wherein the control signals provide setup, initialization, and management of high speed wireless data transmission from the apparatus to the wireless device.

19. The apparatus of claim 13, wherein the second physical layer is used to transmit the high speed wireless data using a frequency division multiple access (FDMA) protocol.

20. The apparatus of claim 13, wherein the directional antennas have a beamwidth of approximately 6.4 to 64 degrees.

21. The apparatus of claim 13, wherein transmission of the high speed wireless data is between a digital video recorder and a television set.

22. The apparatus of claim 13, wherein transmission of the high speed wireless data is between a computer and a video player.

23. The apparatus of claim 13, wherein transmission of the high speed wireless data is between a computer and a digital camera.

* * * * *